United States Patent
Sugimoto et al.

(10) Patent No.: US 10,693,175 B2
(45) Date of Patent: Jun. 23, 2020

(54) BIPOLAR ELECTRODE FOR NICKEL-HYDROGEN STORAGE BATTERY AND NICKEL-HYDROGEN STORAGE BATTERY

(71) Applicant: KABUSHIKI KAISHA TOYOTA JIDOSHOKKI, Kariya-shi, Aichi-ken (JP)

(72) Inventors: Yuki Sugimoto, Aichi-ken (JP); Atsushi Minagata, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 16/462,762

(22) PCT Filed: Nov. 28, 2017

(86) PCT No.: PCT/JP2017/042483
§ 371 (c)(1),
(2) Date: May 21, 2019

(87) PCT Pub. No.: WO2018/101224
PCT Pub. Date: Jun. 7, 2018

(65) Prior Publication Data
US 2020/0058952 A1     Feb. 20, 2020

(30) Foreign Application Priority Data
Nov. 30, 2016  (JP) .................................. 2016-232085
Nov. 10, 2017  (JP) .................................. 2017-217521

(51) Int. Cl.
*H01M 10/04* (2006.01)
*H01M 2/16* (2006.01)
(Continued)

(52) U.S. Cl.
CPC ..... *H01M 10/0418* (2013.01); *H01M 2/1673* (2013.01); *H01M 4/32* (2013.01);
(Continued)

(58) Field of Classification Search
CPC ....... H01M 2004/029; H01M 10/0418; H01M 10/044; H01M 4/32
See application file for complete search history.

(56) References Cited

U.S. PATENT DOCUMENTS

| 4,154,908 A | 5/1979 | Menard |
| 2009/0191461 A1 | 7/2009 | Nakamura |

(Continued)

FOREIGN PATENT DOCUMENTS

| JP | 54-041430 A | 4/1979 |
| JP | 2004-031140 A | 1/2004 |

(Continued)

*Primary Examiner* — James Lee
(74) *Attorney, Agent, or Firm* — Sughrue Mion, PLLC

(57) ABSTRACT

A bipolar electrode includes a metal foil, a first active material layer provided on a front surface of the metal foil, and a second active material layer having a larger area than the first active material layer and provided on a rear surface of the metal foil. The second active material layer includes a low density region disposed in a peripheral portion in plan view as viewed from a thickness direction of the metal foil, and a high density region disposed more inside than the low density region and having a smaller porosity than the low density region.

8 Claims, 6 Drawing Sheets

(51) Int. Cl.
*H01M 4/32* (2006.01)
*H01M 10/30* (2006.01)
*H01M 4/02* (2006.01)

(52) U.S. Cl.
CPC ...... *H01M 10/30* (2013.01); *H01M 2004/027* (2013.01); *H01M 2004/028* (2013.01); *H01M 2004/029* (2013.01)

(56) References Cited

U.S. PATENT DOCUMENTS

2012/0196180 A1    8/2012    Nakamura
2013/0017425 A1    1/2013    Watanabe et al.

FOREIGN PATENT DOCUMENTS

| | | |
|---|---|---|
| JP | 2007-042385 A | 2/2007 |
| JP | 2007-329077 A | 12/2007 |
| JP | 2008-078109 A | 4/2008 |
| JP | 2012-129070 A | 7/2012 |
| JP | 2013-008523 A | 1/2013 |
| JP | 2013-020802 A | 1/2013 |
| JP | 2014-102896 A | 6/2014 |
| JP | 2014-107218 A | 6/2014 |

BIPOLAR ELECTRODE FOR NICKEL-HYDROGEN STORAGE BATTERY AND NICKEL-HYDROGEN STORAGE BATTERY

CROSS REFERENCE TO RELATED APPLICATIONS

This application is a National Stage of International Application No. PCT/JP2017/042483 filed Nov. 28, 2017, claiming priority based on Japanese Patent Applications No. 2016-232085 filed Nov. 30, 2016, and No. 2017-217521 filed Nov. 10, 2017, the contents of all of which are incorporated herein by reference in their entirety.

TECHNICAL FIELD

The present invention relates to a bipolar electrode for a nickel-hydrogen storage battery and a nickel-hydrogen storage battery.

BACKGROUND ART

A bipolar electrode having a metal foil, a positive electrode active material layer coated on one surface of the metal foil, and a negative electrode active material layer coated on the other surface may be used as an electrode in a nickel-hydrogen storage battery. The positive electrode active material layer contains nickel hydroxide ($Ni(OH)_2$) as a positive electrode active material. Further, the negative electrode active material layer contains a hydrogen storage alloy as a negative electrode active material.

In the bipolar electrode, after coating the positive electrode active material layer and the negative electrode active material layer on the metal foil, these active material layers are pressed and brought into close contact with the metal foil, thereby suppressing peeling and falling-off of the active material layers from the metal foil and improving charging and discharging performance. For example, in a bipolar electrode used in a lithium ion secondary battery, pressing is applied to the entire surface of the bipolar electrode (Patent Document 1).

PRIOR ART DOCUMENT

Patent Document

Patent Document 1: Japanese Patent Application Publication No. 2012-129070

SUMMARY OF INVENTION

Problem that the Invention is to Solve

However, in the nickel-hydrogen storage battery, unlike the lithium ion secondary battery, oxygen gas is generated from the positive electrode during overcharge. This oxygen gas is usually absorbed in the negative electrode active material layer, and then reacts with hydrogen in the negative electrode active material provided in advance as a charge reserve and returns to water. However, when the negative electrode active material layer has a small porosity, it is difficult for oxygen gas generated from the positive electrode to enter the negative electrode active material layer, and thus the oxygen gas may accumulate in the battery. Further, if an internal pressure of the battery increases due to the accumulation of oxygen gas, a safety valve may operate in some cases. As a result, balance between the charge reserve and a discharge reserve may be lost, which may lead to deterioration of the battery.

However, in order to avoid such problems, if the porosity of the negative electrode active material layer is simply increased, there are problems such as peeling or falling-off of the negative electrode active material layer from the metal foil is liable to occur or charging and discharging performance deteriorates.

The present invention has been made in view of such background, and it is an object thereof to provide a bipolar electrode for a nickel-hydrogen storage battery which has excellent charging and discharging performance, in which peeling or falling-off of an active material layer from a metal foil and an increase in internal pressure of a battery are suppressed, and a nickel-hydrogen storage battery including this bipolar electrode.

Solution to Problems

One aspect of the present invention is a bipolar electrode for a nickel-hydrogen storage battery, the bipolar electrode including a metal foil, a first active material layer provided on a front surface of the metal foil, and a second active material layer provided on a rear surface of the metal foil and having a larger area than the first active material layer. The second active material layer includes a low density region disposed in a peripheral portion in plan view as viewed from a thickness direction of the metal foil, and a high density region disposed inward of the low density region and having a smaller porosity than the low density region.

Advantageous Effects of Invention

The bipolar electrode for a nickel-hydrogen storage battery (hereinafter simply referred to as "bipolar electrode") has a first active material layer and a second active material layer having a larger area than the first active material layer on a metal foil as a current collector. The second active material layer has a low density region disposed in a peripheral portion in plan view as viewed from a thickness direction of the metal foil, and a high density region disposed more inside than the low density region and having a smaller porosity than the low density region.

In this way, in the bipolar electrode, the porosity of the second active material layer is not merely increased, but the low density region is provided at the specific position that is the peripheral portion of the second active material layer. Thus, the bipolar electrode has excellent charging and discharging performance. Further, in the bipolar electrode, the active material layer neither peels nor falls off from the metal foil. Furthermore, in the bipolar electrode, an increase in the internal pressure of the battery is suppressed.

That is, by providing the low density region in the peripheral portion of the second active material layer, oxygen gas generated during overcharge is efficiently absorbed in the low density region. As a result, the total amount of oxygen gas that can be absorbed in the second active material layer increases. Therefore, an increase in internal pressure of the nickel-hydrogen storage battery is suppressed.

Furthermore, by providing the low density region in the peripheral portion of the second active material layer, the amount of the electrolytic solution held in the low density region increases. Thus, the electrolytic solution consumed as gas during overcharge is replenished from the low density region to the high density region, and hence concentration of current to a part where the electrolytic solution remains due to local disappearance of the electrolytic solution is mitigated. As a result, a lifespan characteristic of the nickel-hydrogen storage battery is improved.

Further, sufficient adhesiveness of the second active material layer with the rear surface of the metal foil is ensured in the high density region having a relatively small porosity. As a result, the second active material layer neither peels nor falls off from the metal foil. Moreover, by decreasing the porosity of the high density region, charging and discharging efficiency increases.

As described above, by providing two regions having different porosities such as a high density region having a relatively small porosity and a low density region having a relatively large porosity in the second active material layer, the bipolar electrode has excellent charging and discharging performance. Further, in the bipolar electrode, the active material layer neither peels nor falls off from the metal foil. Furthermore, in the bipolar electrode, an increase in internal pressure of the battery is suppressed.

DESCRIPTION OF EMBODIMENTS

Figure 1:
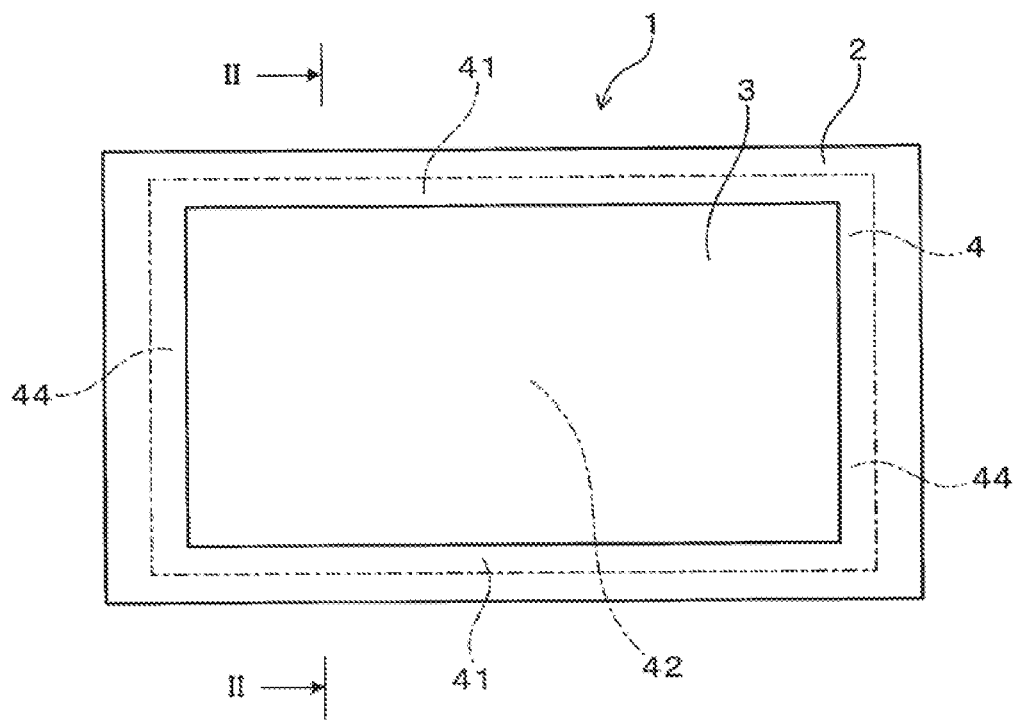
FIG. 1 is a plan view of a bipolar electrode in a first embodiment.

In the bipolar electrode, a metal foil functions as a current collector. The current collector is a chemically inert electronic conductor for continuing to pass current to the electrode during discharging or charging of the nickel-hydrogen storage battery. The metal constituting the current collector is not particularly limited as long as it is a metal capable of withstanding a voltage for bringing the active material into reaction. As the current collector, for example, a nickel foil, a nickel plated copper foil, a nickel plated stainless steel foil, or the like may be employed. The thickness of the metal foil may be appropriately set within the range of, for example, from 5 to 100 μm.

A first active material layer usually contains a first active material and a binder. In addition, the first active material layer may further contain a known additive such as a conductive assistant. The thickness of the first active material layer may be set according to electrode characteristics. For example, the thickness of the first active material layer is from 30 to 150 μm.

The second active material layer usually contains a second active material and a binder. In addition, the second active material layer may further contain a known additive such as a conductive assistant. The thickness of the second active material layer may be set according to electrode characteristics. For example, the thickness of the second active material layer is from 30 to 150 μm.

The binder in these active material layers has a function to connect the active material or the like to a surface of the metal foil. As the binder, publicly known binders for nickel-hydrogen storage batteries can be used. As the binder, for example, fluorine-containing resins such as polyvinylidene fluoride, polytetrafluoroethylene, and fluororubber, polyolefin resins such as polypropylene and polyethylene, imide resins such as polyimide and polyamideimide, cellulosics such as carboxymethyl cellulose, methyl cellulose, and hydroxypropyl cellulose, (meth)acrylic resins containing a (meth)acrylic acid derivative such as polyacrylic acid, polyacrylic acid ester, polymethacrylic acid, and polymethacrylic acid ester as a monomer unit can be used.

The second active material layer has a low density region and a high density region. As a method for forming these regions, for example, the following methods are employed. That is, for forming the low density region, a method may be employed that makes the porosity of the low density region larger than that of the high density region by using a slurry that is different in content of the second active material, particle size distribution, binder content, and the like from a slurry used for forming the high density region.

Further, a method of making a coating thickness of the slurry in the high density region larger than that in the low density region and compressing the high density region by pressing to increase make the porosity of the high density region smaller than that of the low density region may be employed. Further, a method may be employed to make a difference in press amount by a method of pressing only the high density region at a time of pressing, or pressing the high density region stronger than the low density region, or the like, so as to make the porosity of the high density region higher smaller than that of the low density region. These methods may be carried out independently, or a plurality of methods may be used in combination.

From the viewpoint of simplifying the manufacturing process of the bipolar electrode, among the above-described methods, the method to make a difference in press amount is preferable. In this case, since a difference in porosity is made with only one type of slurry, it is not necessary to prepare a plurality of slurries for forming the second active material layer. Further, even when the slurry is uniformly applied, since a difference in porosity occurs due to the press amount, the coating amount of the slurry can be easily controlled. Therefore, by employing the method to make a difference in press amount, it is not necessary to carry out the complicated preparation or the precise control of the coating amount as described above. As a result, the manufacturing process of the bipolar electrode is simplified.

It is preferable that the high density region of the second active material layer be disposed at a position overlapping with at least a part of the first active material layer in plan view as viewed from a thickness direction of the metal foil. In this case, charging and discharging efficiency of the nickel-hydrogen storage battery becomes higher since the electrode reacts more actively in the high density region where the porosity is relatively small and efficiency of electrode reaction is high.

The porosity of the high density region is preferably from 28 to 40%. This further improves the efficiency of electrode reaction in the high density region. As a result, the charging and discharging efficiency of the nickel-hydrogen storage battery is further improved.

The porosity of the low density region is preferably from 56 to 63%. Thus, a larger amount of oxygen gas is absorbed in the low density region. As a result, an increase in internal pressure of the nickel-hydrogen storage battery can be suppressed more effectively. Further, in this case, since a larger amount of electrolytic solution is held in the low density region, the lifespan characteristic of the nickel-hydrogen storage battery is further improved.

The thickness of the low density region may be thicker than the thickness of the high density region. The nickel-hydrogen storage battery has an electrode assembly in which a plurality of electrodes are stacked with a separator interposed therebetween. In the electrode assembly including the bipolar electrode, what is called a dead space is formed where the first active material layer is not present between the second active material layer of the bipolar electrode and the current collector of the electrode adjacent to the bipolar electrode. On the other hand, since the low density region is disposed in a peripheral portion of the second active material layer, the low density region is disposed in the dead space. By disposing the low density region in the dead space, an increase in dimension in a stacking direction of the electrode assembly is suppressed.

Further, in the dead space described above, since the first active material layer and the second active material layer do not face each other, electrode reaction hardly occurs. Accordingly, by disposing the low density region in the dead space, a contribution of electrode reaction in the high density region where efficiency of electrode reaction is high is relatively increased, and the charging and discharging efficiency of the nickel-hydrogen storage battery becomes higher.

An intermediate region having a larger thickness as being closer to the low density region may be interposed between the low density region and the high density region. In this case, even when the bipolar electrode is slightly displaced from a desired position during the assembling of the electrode assembly, an increase in dimension in the stacking direction of the electrode assembly is suppressed. Therefore, workability in the assembling of the electrode assembly is improved.

In the bipolar electrode, it is preferable that the first active material layer be the positive electrode active material layer and the second active material layer be the negative electrode active material layer. As described above, oxygen gas generated from the positive electrode during overcharge is absorbed in the negative electrode active material layer. When the second active material layer is used as the negative electrode active material layer, hydrogen as a charge reserve is provided in advance in the low density region of the second active material layer. Thus, the oxygen gas absorbed in the negative electrode active material reacts with hydrogen as a charge reserve and returns to water. As a result, an increase in the internal pressure of the battery due to accumulation of oxygen gas can be suppressed more effectively.

As the positive electrode active material, for example, nickel hydroxide ($Ni(OH)_2$) is used. Further, as the negative electrode active material, for example, a hydrogen storage alloy is used.

The electrode assembly of the nickel-hydrogen storage battery is formed by stacking a plurality of electrodes including the above-described bipolar electrodes with separators interposed therebetween. That is, the nickel-hydrogen storage battery including the bipolar electrodes has an electrode assembly in which a plurality of electrodes are stacked with separators interposed therebetween. The electrode assembly has terminal electrodes disposed at both ends thereof in the stacking direction and the bipolar electrodes disposed between the terminal electrodes.

The nickel-hydrogen storage battery has excellent charging and discharging performance as described above by employing the bipolar electrode in the electrode assembly. Further, according to the nickel-hydrogen storage battery, the active material layer neither peels nor falls off from the metal foil. Furthermore, according to the nickel-hydrogen storage battery, an increase in internal pressure of the battery is suppressed.

The bipolar electrode included in the electrode assembly may be a single bipolar electrode or a plurality of bipolar electrodes. Further, as a separator interposed between the electrodes, a publicly known material may be used. For example, the separator may be a nonwoven fabric or a woven fabric made of a synthetic resin such as polytetrafluoroethylene, polypropylene, polyethylene, polyimide, polyamide, or the like. Further, the separator may be a porous body made of an electrically insulating material such as ceramics. Furthermore, the separator may be a stacked body in which two or more layers of the above-described nonwoven fabric, woven fabric, and porous body are stacked.

As described above, the nickel-hydrogen storage battery has a high energy density and maintains a high battery capacity over a long period of time. Therefore, the nickel-hydrogen storage battery is used for vehicles such as forklift, hybrid vehicle, and electric vehicle, for example.

EMBODIMENTS

First Embodiment

Figure 2:
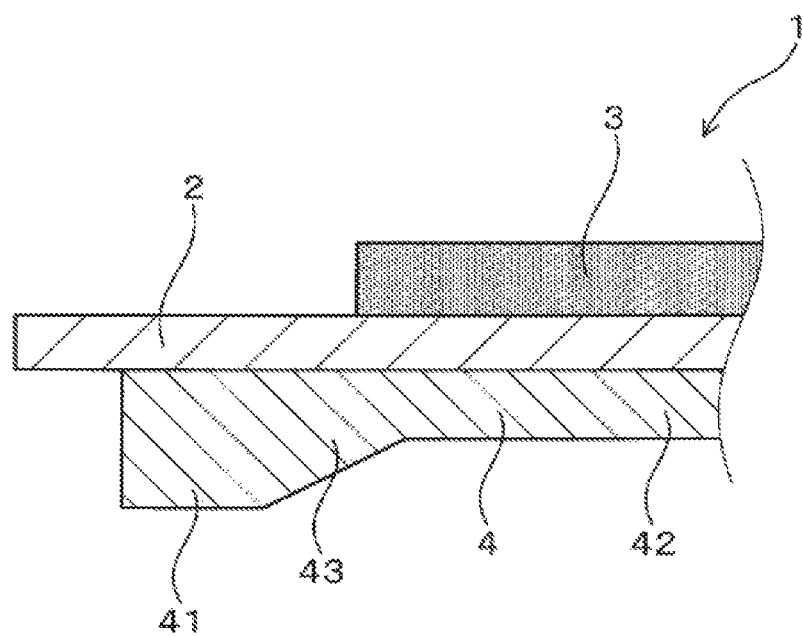
FIG. 2 is a partial cross-sectional view taken along a line II-II of FIG. 1 viewed in an arrow direction.

An embodiment of the bipolar electrode will be described with reference to the drawings. As illustrated in FIG. 1 and FIG. 2, a bipolar electrode 1 includes a metal foil 2, a first active material layer 3 provided on a front surface of the metal foil 2, and a second active material layer 4 having a larger area than the first active material layer 3 and provided on a rear surface of the metal foil 2. The second active material layer 4 has low density regions 41 disposed in a peripheral portion in plan view as viewed from a thickness direction of the metal foil 2, and a high density region 42 disposed inward of the low density regions 41 and having a porosity smaller than that of the low density regions 41.

As illustrated in FIG. 1, the metal foil 2 of the present embodiment has a rectangular shape in plan view as viewed from the thickness direction thereof. Dimensions of the metal foil 2 are 350 mm in length, 220 mm in width, and 25 μm in thickness. In addition, the metal foil 2 of the present embodiment is a nickel foil.

On the front surface of the metal foil 2, the first active material layer 3 having a rectangular shape in plan view as viewed from the thickness direction thereof is provided. The first active material layer 3 in the present embodiment is a positive electrode active material layer, and contains nickel hydroxide as a positive electrode active material, and acrylic resin emulsion and carboxymethyl cellulose as binders. Dimensions of the first active material layer 3 are 336 mm in length, 206 mm in width, and 90 μm in thickness.

On the rear surface of the metal foil 2, the second active material layer 4 having a rectangular shape in plan view as viewed from the thickness direction thereof is provided. The second active material layer 4 in the present embodiment is a negative electrode active material layer, and contains a hydrogen storage alloy as a negative electrode active material, and acrylic resin emulsion and carboxymethyl cellulose as binders. Dimensions of the second active material layer 4 are 340 mm in length and 210 mm in width.

As illustrated in FIG. 1 and FIG. 2, the low density regions 41 are provided at both ends in a width direction of the second active material layer 4, extending along long sides of the second active material layer 4. The low density regions 41 have a thickness of 110 μm and a porosity of from 56 to 63%.

Further, the high density region 42 having a rectangular shape is provided inward of the low density regions 41 in the width direction. As illustrated in FIG. 1 and FIG. 2, the high density region 42 is disposed at a position overlapping with the entire first active material layer 3 in plan view as viewed from the thickness direction of the metal foil 2. The high density region 42 has a thickness of 70 μm and a porosity of from 28 to 40%.

The porosity of the low density regions 41 and the high density region 42 can be obtained by the following measuring method. That is, a sample for measurement is sampled from each region, and electrode density (g/cm$^3$) of the sample containing pores is calculated by dividing the mass (g) of this sample by the volume (cm$^3$). Further, based on a volume ratio (vol %) and true density (g/cm$^3$) of the material contained in this sample, the electrode density (g/cm$^3$) of the sample when it is assumed that no pore is present is calculated.

By dividing the electrode density (g/cm$^3$) of the sample including pores obtained as described above by the electrode density (g/cm$^3$) of the sample when it is assumed that no pore is present, a filling rate (%) of the sample is obtained. The value obtained by subtracting the filling rate (%) from 100% is the porosity (%).

As illustrated in FIG. 2, between the low density region 41 and the high density region 42, an intermediate region 43 having a larger thickness as being closer to the low density region 41 is interposed.

Figure 3:
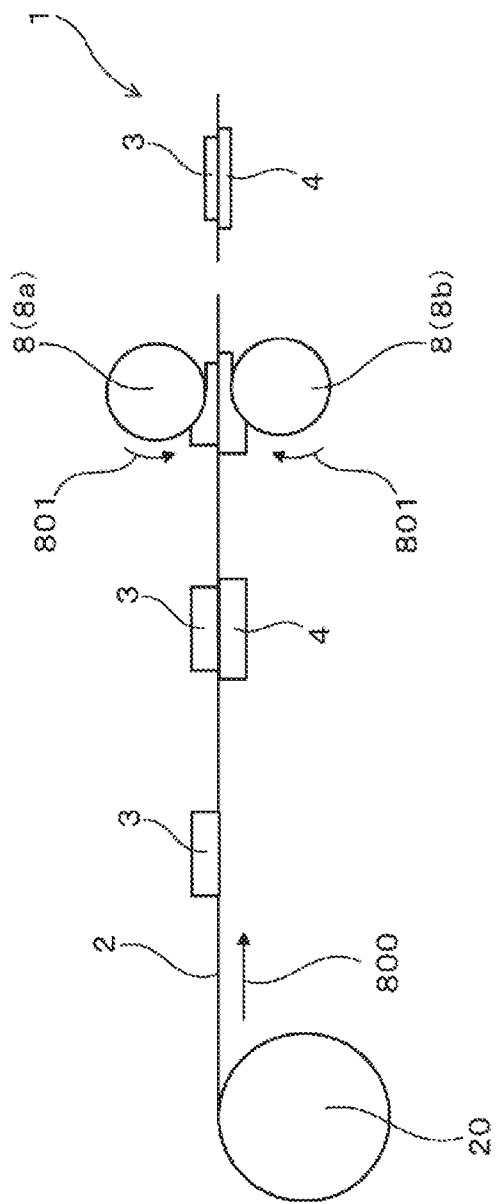
FIG. 3 is an explanatory view illustrating a main part of a method of manufacturing a bipolar electrode in the first embodiment.

The bipolar electrode 1 of the present embodiment is fabricated, for example, by a method illustrated in FIG. 3. As illustrated in FIG. 3, the metal foil 2 is drawn out from a metal foil roll 20 and conveyed along a conveying direction 800. On the front surface of the metal foil 2, the first active material layer 3 having a uniform thickness and having the above-described dimensions is formed. Then, the second active material layer 4 having a uniform thickness and having the above-described dimensions is formed on the rear surface of the metal foil 2. In addition, these active material layers 3, 4 are formed by, for example, applying a slurry containing an active material and a binder.

Figure 4:
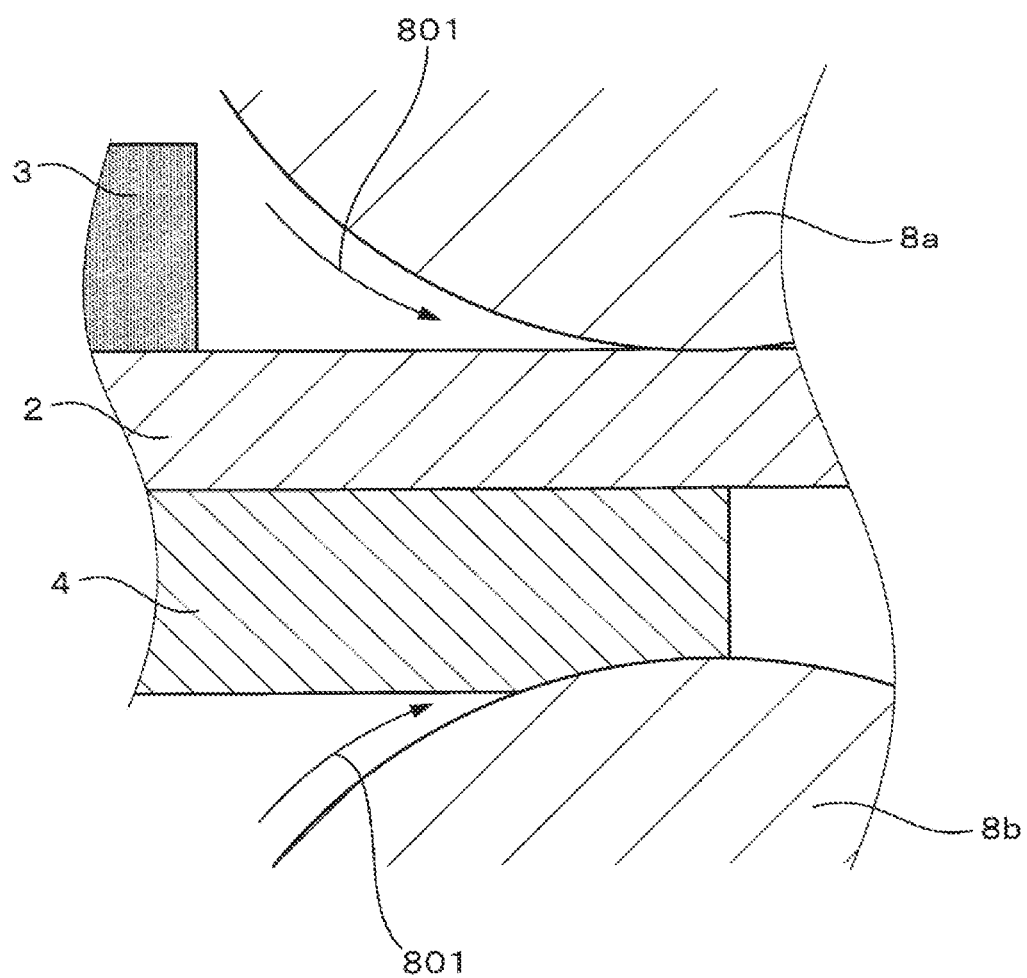
FIG. 4 is a cross-sectional view in a longitudinal direction at a time when a second active material layer enters between a pair of compression rolls in the manufacturing method of the first embodiment.

Thereafter, the metal foil 2 on which the active material layers 3, 4 are formed is passed between a pair of compression rolls 8 (8a, 8b) rotating in directions of arrows 801, thereby pressing the first active material layer 3 and the second active material layer 4. At a time when the second active material layer 4 enters between the pair of compression rolls 8, as illustrated in FIG. 4, the first active material layer 3 is not present on the front surface of the metal foil 2. Therefore, the entire range in the width direction of the second active material layer 4 is pressed by the pair of compression rolls 8.

Figure 5:
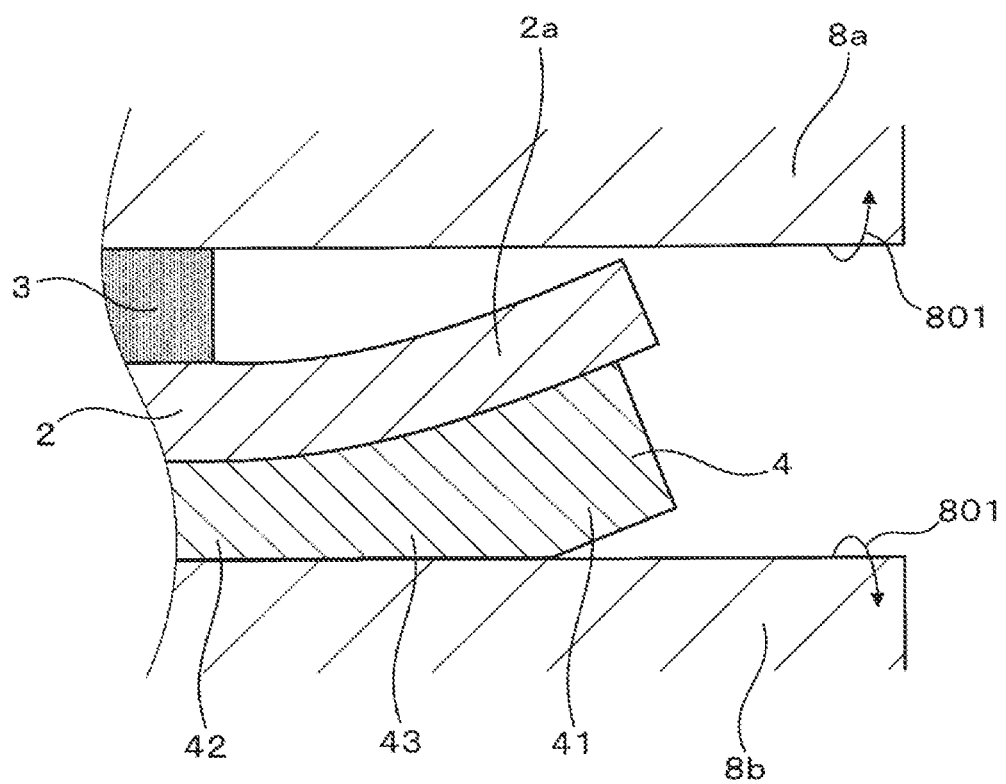
FIG. 5 is a cross-sectional view in a width direction at a time when both a first active material layer and the second active material layer enter between a pair of compression rolls in the manufacturing method of the first embodiment.

When the metal foil 2 further advances and both the first active material layer 3 and the second active material layer 4 enter between the pair of compression rolls 8, both the first active material layer 3 and the second active material layer 4 are pressed as illustrated in FIG. 5 in a central portion in the width direction, that is, a direction perpendicular to both the conveying direction 800 and the thickness direction of the metal foil 2. Thus, the high density region 42 is formed in the central portion in the width direction of the second active material layer 4.

On the other hand, since the first active material layer 3 does not exist on the rear surface of the metal foil 2 at both end portions in the width direction, a gap is formed between the compression roll 8a on the first active material layer 3 side of the pair of compression rolls 8 and the metal foil 2. An end portion 2a of the metal foil present in this gap deforms like bending, so that the distance between the end portion 2a of the metal foil and the compression roll 8b on the second active material layer 4 side becomes large, as it gets closer to an edge in the width direction. As a result, the second active material layer 4 is distanced from the compression roll 8b at the both end portions in the width direction, and the low density region 41 is formed. Further, between the high density region 42 and the low density region 41, the second active material layer 4 is compressed according to the distance between the metal foil 2 and the compression roll 8b. As a result, the intermediate region 43 having a larger thickness as being closer to the low density region 41 is formed.

Then, after the metal foil 2 further advances and the first active material layer 3 completely passes between the pair of compression rolls 8, similarly to FIG. 4, the entire range in the width direction of the second active material layer 4 is pressed by the pair of compression rolls 8. Therefore, the porosity of both end portions 44 (see FIG. 1) in a longitudinal direction of the second active material layer 4 is of an approximately intermediate value between those of the high density region 42 and the low density region 41.

Thereafter, the metal foil 2 is cut into a desired size, thereby obtaining the bipolar electrode 1.

Next, operation and effect of the bipolar electrode 1 of the present embodiment will be described. In the bipolar electrode 1, the porosity of the second active material layer 4 is not merely increased, but the low density region 41 is provided at the specific position that is the peripheral portion of the second active material layer 4. Thus, the total amount of oxygen gas that can be absorbed in the second active material layer 4 is increased, and an increase in the internal pressure of the nickel-hydrogen storage battery is suppressed. Furthermore, the amount of the electrolytic solution held in the low density region 41 increases, and concentration of current to a part where the electrolytic solution remains due to local disappearance of the electrolytic solution at a time of overcharge is mitigated. As a result, performance of the nickel-hydrogen storage battery is maintained over a long period of time.

Further, sufficient adhesiveness of the second active material layer 4 with the metal foil 2 is ensured in the high density region 42 having a relatively small porosity. As a result, the second active material layer 4 neither peels nor falls off from the metal foil 2. Moreover, by decreasing the porosity of the high density region 42, the charging and discharging efficiency increases.

Further, as illustrated in FIG. 1 and FIG. 2, in plan view as viewed from the thickness direction of the metal foil 2, the high density region 42 of the second active material layer 4 is disposed at a position overlapping with the first active material layer 3. Thus, electrode reactions can be actively caused in the high density region 42 having a relatively small porosity and high efficiency of electrode reaction. As a result, the charging and discharging efficiency of the nickel-hydrogen storage battery is further enhanced.

The porosity of the high density region 42 is from 28 to 40%. Thus, the efficiency of electrode reaction in the high density region 42 is further improved. As a result, the charging and discharging efficiency of the nickel-hydrogen storage battery is further improved.

The porosity of the low density region 41 is from 56 to 63%. Thus, a large amount of oxygen gas is absorbed by the low density region 41 of the second active material layer 4. As a result, an increase in the internal pressure of the nickel-hydrogen storage battery can be suppressed more effectively. Further, by setting the porosity of the low density region 41 to the above-mentioned specific range, a larger amount of electrolytic solution is held in the low density region 41. Therefore, the lifespan characteristic of the nickel-hydrogen storage battery is further improved.

In addition, the first active material layer 3 is a positive electrode active material layer and the second active material layer 4 is a negative electrode active material layer. Thus, oxygen gas generated from the positive electrode during overcharge is absorbed in the negative electrode active material layer, and then reacts with hydrogen as a charge reserve in the negative electrode active material layer and returns to water. As a result, an increase in the internal pressure of the battery due to accumulation of oxygen gas can be suppressed more effectively.

As described above, the bipolar electrode 1 has excellent charging and discharging performance. Further, in the bipolar electrode 1, the active material layers 3, 4 neither peels nor falls off from the metal foil 2. Furthermore, in the bipolar electrode 1, an increase in internal pressure of the battery is suppressed.

Second Embodiment

Figure 6:
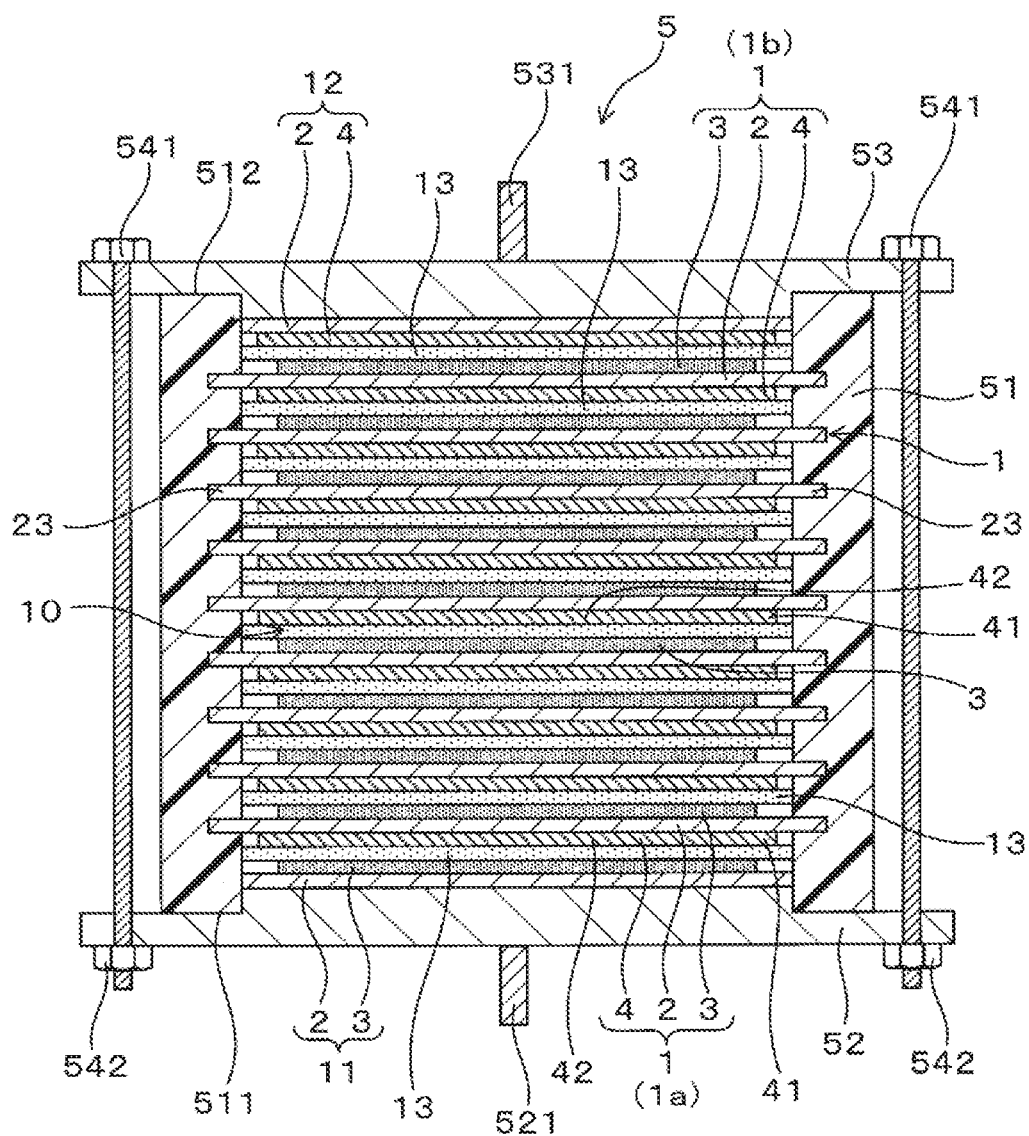
FIG. 6 is a cross-sectional view illustrating a main part of a nickel-hydrogen storage battery in a second embodiment.

The present embodiment is an example of a nickel-hydrogen storage battery 5 provided with bipolar electrodes 1. Of the reference numerals used in the present and subsequent embodiments, the same reference numerals as those used in the previous embodiment represent the same components and the like as the components and the like in the previous embodiment unless otherwise described. As illustrated in FIG. 6, the nickel-hydrogen storage battery 5 has an electrode assembly 10 in which pluralities of electrodes 1, 11, 12 are stacked with separators 13 interposed therebetween. In addition, as the separator 13, nonwoven fabric made of polyolefin fiber is used. The electrode assembly 10 has terminal electrodes 11, 12 disposed at both ends in a stacking direction thereof and bipolar electrodes 1 disposed between the terminal electrodes 11, 12.

The electrode assembly 10 of the present embodiment has a plurality of bipolar electrodes 1 between a first terminal electrode 11 disposed at one end in the stacking direction and a second terminal electrode 12 disposed at the other end thereof. The plurality of bipolar electrodes 1 are stacked such that a first active material layer 3, a metal foil 2 as a current collector, a second active material layer 4, and a separator 13 are repeatedly arranged in this order.

A high density region 42 of the second active material layer 4 in each bipolar electrode 1 is disposed at a position facing the first active material layer 3 of the adjacent electrode 1, 11 with a separator 13 interposed therebetween. Further, a low density region 41 of each bipolar electrode 1 is disposed in a dead space of the electrode assembly 10, that is, a portion where the first active material layer 3 does not exist between metal foils 2 of adjacent electrodes 1, 11, 12.

The first terminal electrode 11 has a metal foil 2 and a first active material layer 3 provided on one surface of the metal foil 2. The first active material layer 3 of the first terminal electrode 11 faces the second active material layer 4 of a bipolar electrode 1a disposed at one end in the stacking direction with a separator 13 interposed therebetween.

The second terminal electrode 12 has a metal foil 2 and a second active material layer 4 provided on one surface of the metal foil 2. The second active material layer 4 of the second terminal electrode 12 faces the first active material layer 3 of a bipolar electrode 1b disposed at the other end in the stacking direction with a separator 13 interposed therebetween.

The electrode assembly 10 is accommodated in a cylindrical case 51. Further, open ends of the case 51 are closed by a first plate 52 and a second plate 53. An electrolytic solution is filled in the internal space surrounded by the case 51, the first plate 52, and the second plate 53 in the nickel-hydrogen storage battery 5. Further, as the electrolytic solution, for example, an electrolytic solution publicly known for a nickel-hydrogen storage battery, such as a potassium hydroxide aqueous solution, can be used.

The case 51 is made of an insulating resin such as polypropylene, polyphenylenesulfide, or modified polyphenylene ether. In an inner wall of the case 51, outer peripheral edges 23 of the metal foils 2 of the bipolar electrodes 1 are held.

The first plate 52 is made of metal and is in contact with the metal foil 2 of the first terminal electrode 11 and one open end face 511 of the case 51. Further, a first electrode terminal 521 is attached to a portion of the first plate 52 exposed to the outside of the case 51. The first electrode terminal 521 is electrically connected to the first terminal electrode 11 with the first plate 52 interposed therebetween.

The second plate 53 is in contact with the metal foil 2 of the second terminal electrode 12 and the other open end face 512 of the case 51. Further, a second electrode terminal 531 is attached to a portion of the second plate 53 exposed to the outside of the case 51. The second electrode terminal 531 is electrically connected to the second terminal electrode 12 with the second plate 53 interposed therebetween.

Outer peripheral edges of the first plate 52 and the second plate 53 extend outward beyond the case 51. The outer peripheral edge of the first plate 52 and the outer peripheral edge of the second plate 53 are fastened by a bolt 541 and a nut 542 with an insulating member interposed therebetween, which is not illustrated. Thus, the first plate 52 and the second plate 53 are brought into close contact with the open end faces 511, 512 of the case 51, respectively, and the open ends of the case 51 are closed.

Next, the operation and effect of the nickel-hydrogen storage battery 5 of the present embodiment will be described. The nickel-hydrogen storage battery 5 has, as described above, excellent charging and discharging performance by employing the bipolar electrode 1 for the electrode assembly 10. Further, in the nickel-hydrogen storage battery 5, the second active material layer 4 neither peels nor falls off from the metal foil 2. Furthermore, in the nickel-hydrogen storage battery 5, an increase in the internal pressure of the battery is suppressed.

Further, the low density region 41 of the second active material layer 4 is disposed in the dead space of the electrode assembly 10. Thus, an increase in dimension in the stacking direction of the electrode assembly 10 is suppressed. Further, by disposing the low density region 41 in the dead space, electrode reaction in the low density region 41 having a relatively large porosity and low efficiency of electrode reaction is suppressed. In this manner, a contribution of the electrode reaction in the high density region 42 where the efficiency of electrode reaction is high is relatively increased, and the charging and discharging efficiency of the nickel-hydrogen storage battery 5 is further enhanced.

Further, between the low density region 41 and the high density region 42, the intermediate region 43, the thickness of which increases as being closer to the low density region 41, is interposed. Thus, even when the bipolar electrode 1 is disposed at a position that is slightly displaced from a desired position during the assembling of the electrode assembly 10, an increase in the dimension in the stacking direction of the electrode assembly 10 is suppressed. Therefore, workability of assembling operation of the electrode assembly 10 is improved.

Embodiments of the bipolar electrode 1 and the nickel-hydrogen storage battery 5 according to the present invention are not limited to the embodiments illustrated in the first embodiment and the second embodiment, and the configurations may be appropriately changed within the range not impairing the gist of the invention.

DESCRIPTION OF REFERENCE NUMERALS 1 bipolar electrode
2 metal foil
3 first active material layer
4 second active material layer
41 low density region
42 high density region

The invention claimed is:

1. A bipolar electrode for a nickel-hydrogen storage battery, the bipolar electrode comprising:
 a metal foil;
 a first active material layer provided on a front surface of the metal foil; and
 a second active material layer provided on a rear surface of the metal foil and having a larger area than the first active material layer,
 wherein the second active material layer includes
  a low density region disposed in a peripheral portion in plan view as viewed from a thickness direction of the metal foil, and
  a high density region disposed inward of the low density region and having a smaller porosity than the low density region.

2. The bipolar electrode for a nickel-hydrogen storage battery according to claim 1, wherein
 the high density region is disposed at a position overlapping with at least a part of the first active material layer in plan view as viewed from the thickness direction of the metal foil.

3. The bipolar electrode for a nickel-hydrogen storage battery according to claim 1, wherein
 the high density region has a porosity of from 28 to 40%.

4. The bipolar electrode for a nickel-hydrogen storage battery according to claim 1, wherein
 the low density region has a porosity of from 56 to 63%.

5. The bipolar electrode for a nickel-hydrogen storage battery according to claim 1, wherein
 a thickness of the low density region is larger than a thickness of the high density region.

6. The bipolar electrode for a nickel-hydrogen storage battery according to claim 5, wherein
 an intermediate region having a larger thickness as being closer to the low density region is interposed between the low density region and the high density region.

7. The bipolar electrode for a nickel-hydrogen storage battery according to claim 1, wherein
 the first active material layer is a positive electrode active material layer and the second active material layer is a negative electrode active material layer.

8. A nickel-hydrogen storage battery comprising:
 an electrode assembly in which a plurality of electrodes are stacked with separators interposed therebetween,
 wherein the electrode assembly includes
  terminal electrodes disposed at both ends in a stacking direction, and
  the bipolar electrode for a nickel-hydrogen storage battery according to claim 1 disposed between the terminal electrodes.

* * * * *